United States Patent
Robert et al.

(10) Patent No.: US 8,184,125 B2
(45) Date of Patent: May 22, 2012

(54) IMAGE PROCESSING METHOD AND DEVICE IMPLEMENTING SAID METHOD

(75) Inventors: Philippe Robert, Thorigne Fouillard (FR); Guylaine Le Jan, Betton (FR); Jürgen Stauder, Montreuil sur Ille (FR)

(73) Assignee: Thomson Licensing, Boulogne-Billancourt (FR)

( * ) Notice: Subject to any disclaimer, the term of this patent is extended or adjusted under 35 U.S.C. 154(b) by 530 days.

(21) Appl. No.: 12/448,447

(22) PCT Filed: Dec. 17, 2007

(86) PCT No.: PCT/EP2007/064086
§ 371 (c)(1),
(2), (4) Date: Jun. 19, 2009

(87) PCT Pub. No.: WO2008/074785
PCT Pub. Date: Jun. 26, 2008

(65) Prior Publication Data
US 2010/0053199 A1 Mar. 4, 2010

(30) Foreign Application Priority Data
Dec. 21, 2006 (FR) .................................... 06 55765

(51) Int. Cl.
*G06T 11/20* (2006.01)
*G09G 5/02* (2006.01)
(52) U.S. Cl. ......... 345/595; 345/611; 345/440; 348/441
(58) Field of Classification Search .................. 345/440, 345/611, 595; 348/441
See application file for complete search history.

(56) References Cited

U.S. PATENT DOCUMENTS

| 5,893,095 | A | * | 4/1999 | Jain et al. ............... 1/1 |
| 6,121,969 | A | * | 9/2000 | Jain et al. ............... 715/850 |
| 2003/0067546 | A1 | | 4/2003 | Asano |
| 2005/0207669 | A1 | | 9/2005 | Kameyama |

FOREIGN PATENT DOCUMENTS

JP 2000-324365 11/2000

OTHER PUBLICATIONS

P. Schallauer et al:"Automatic Restoration Algorithms for 35mm Film". Videre: Journal of Computer Vision Research, Massachusetts Institute of Technology, US, vol. 1, No. 3, 1999, pp. 60-85, XP002438541.
Search Report Dated Mar. 14, 2008.

* cited by examiner

*Primary Examiner* — M Good Johnson
(74) *Attorney, Agent, or Firm* — Robert D. Shedd; Vincent E. Duffy; James McKenzie

(57) ABSTRACT

The invention relates to a processing method of a sequence of images comprising image points each of which is associated with a color component. The method comprises a processing step of at least one image of the sequence from reference images, the processing step being adapted to reduce the flicker effects. According to the invention, the reference images are selected according to the following stages:
calculate, for at least one image part of each of the images of the sequence, the mean value of the colour component, the mean value being associated with the image, and
a first selection step to select from the mean values a first series of reference images forming a subset of the sequence.

13 Claims, 3 Drawing Sheets

US 8,184,125 B2

IMAGE PROCESSING METHOD AND DEVICE IMPLEMENTING SAID METHOD

Figure 1:
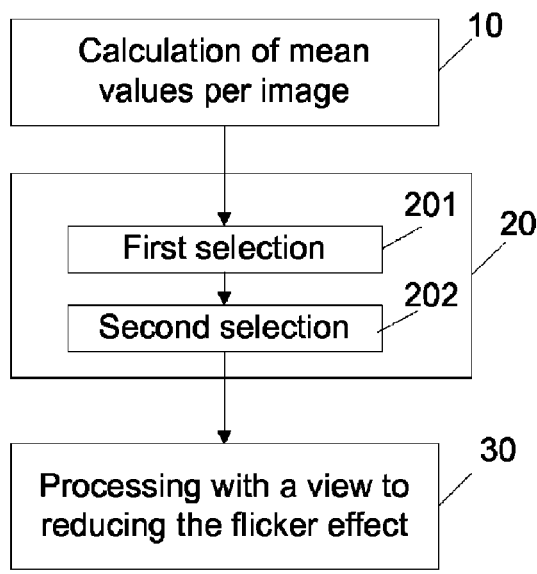

This application claims the benefit, under 35 U.S.C. §365 of International Application PCT/EP2007/064086, filed Dec. 17, 2007, which was published in accordance with PCT Article 21(2) on Jun. 26, 2008 in English and which claims the benefit of French patent application No. 06/55765, filed Dec. 21, 2006.

1. SCOPE OF THE INVENTION

The invention relates to a processing method of a sequence of images with a view to reducing the flicker effect. The invention also relates to a device implementing said method.

2. PRIOR ART

The techniques for reducing the flicker effect (de-flickering) consist in removing the instability of the distribution of colour intensities throughout the sequence. Most of the techniques use reference images selected beforehand. They consist in modifying the distribution of the colour intensities in a current image so that this distribution is similar to the distribution of colour intensities in one or more reference images. A known method is described in the article by P. Shallower, A. Pins, W. Haas entitled "*Automatic restoration algorithms for 35 mm film*", and published in Videre—Journal of Computer Vision Research, Vol. 1, n°3, 1999. It consists in calculating, for each colour component, the histogram of a current image and a reference image. Each histogram is assimilated with a probability density from which a distribution function is deduced. This method then consists in calculating, for each colour component, an increasing monotonic transformation from the histogram of the current image, from the histogram of the reference image and from the corresponding distribution functions. The transformation is then applied for each colour component, at each pixel of the current image. For each colour component, the histogram of the transformed current image is made similar to the histogram corresponding to the reference image. In practice, the reference images are selected manually. The greater the activity in the image sequence, the closer the reference images must be. Conversely, the lower the activity, the more distant the reference images must be. Indeed, it is desirable that the reference images are sufficiently distant to ensure a good stability of the colour component in relation to the flicker effect.

3. SUMMARY OF THE INVENTION

The invention is an image processing method using reference images. It relates more particularly to a selection method of the reference images with a view to reducing the flicker effect.

The invention relates to a processing method of a sequence of images comprising image points each of which is associated with at least one colour component. The method comprises a processing step of at least one image of the sequence from reference images, the processing step being adapted to reduce the flicker effects. According to the invention, the reference images are selected according to the following stages:

calculate for at least one image part of each of the images of the sequence, the mean value of the at least one colour component, the mean value being associated with the image, and a first selection step to select from the mean values a first series of reference images forming a subset of the sequence.

According to one particular characteristic of the invention, the first series of reference images comprises images from the sequence of which the associated mean value is situated in an interval of a predetermined width centred on a reference value associated with the image.

According to an advantageous characteristic, the reference value associated with the image is equal to the average of the mean values associated with all the images of the sequence.

According to an advantageous embodiment, the first selection step is followed by a second selection step The second selection step consists in selecting a second series of reference images forming a subset of the first series of reference images such that two successive images of the second series are spaced at a temporal distance contained within a predetermined time interval.

According to another advantageous embodiment, the first selection step is followed by a second selection step The second selection step consists in selecting a second series of reference images forming a subset of the first series of reference images such that a correlation value calculated between two successive images of the second series is greater than a predetermined threshold.

The invention also relates to a processing device of a sequence of images comprising image points each of which is associated with at least one colour component. The device comprises processing means adapted to reduce the flicker effects in the sequence from reference images. It also comprises:

calculation means to calculate, for at least one image part of each of the images of the sequence, the mean value of the at least one colour component, the mean value being associated with the image, selection means to select, from the mean values, a series of reference images forming a subset of the sequence, and display means to display a graph on which a curve is drawn, called curve of the mean values, representative of the mean values calculated by the calculation means.

According to one embodiment of the invention, the selection means selects the images of the sequence of which the associated mean value is situated in an interval of a predetermined width centred on a reference value associated with the image.

The display means are adapted to display on the graph a reference curve, the reference value associated with the image being determined from the reference line.

According to a particular characteristic of the invention, the reference line is a horizontal line segment.

According to another particular characteristic of the invention, the reference line is an oblique line segment.

According to another particular characteristic of the invention, the reference line is mobile on the screen between two positions.

According to a particularly advantageous embodiment, each of the reference images selected by the selection means is identified on the screen using a circle surrounding, on the mean values curve, the point whose ordinate is equal to the mean value associated with the reference image.

According to another particularly advantageous embodiment, each of the reference images selected by the selection means is identified on the screen using a highlighted point, on the mean values curve, whose ordinate is equal to the mean value associated with the reference image.

According to another particularly advantageous embodiment, a coloured icon is displayed on the screen to indicate a level of correlation between two successive reference images selected by the selection means, the colour of the icon being representative of the level of correlation.

4. LIST OF FIGURES

Figure 2:
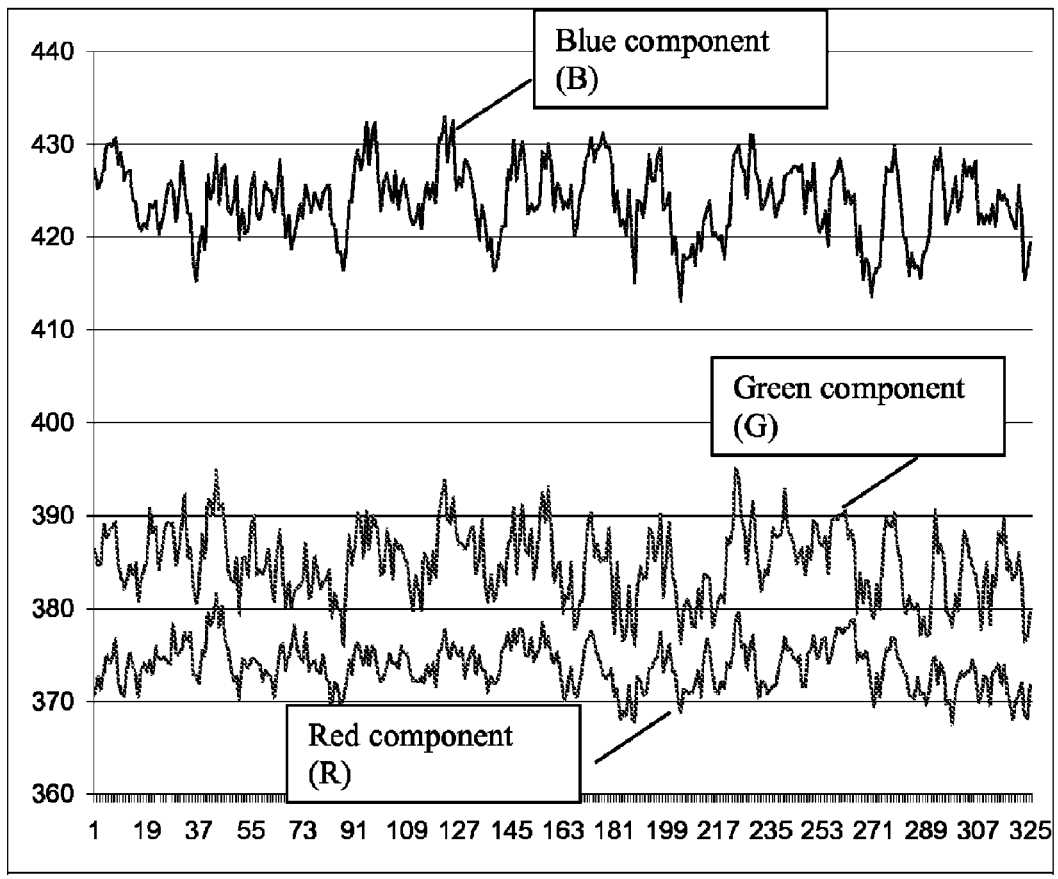
Figure 3:
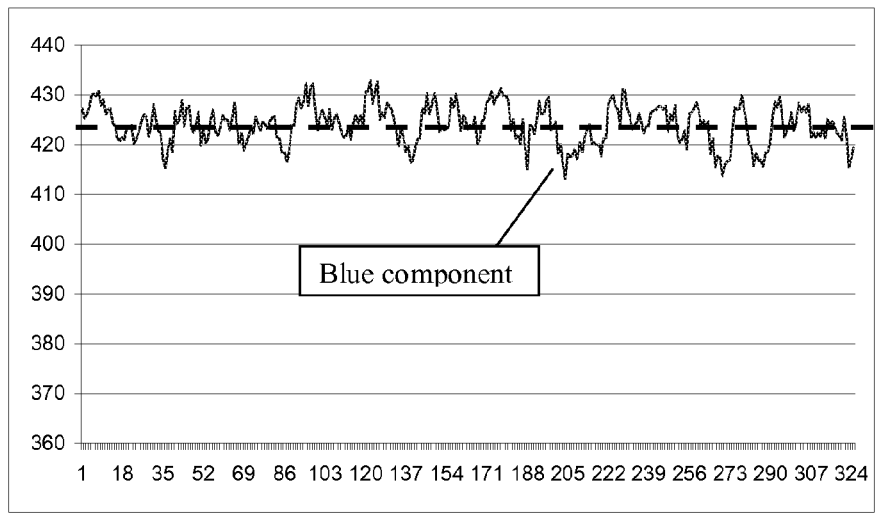
Figure 4:
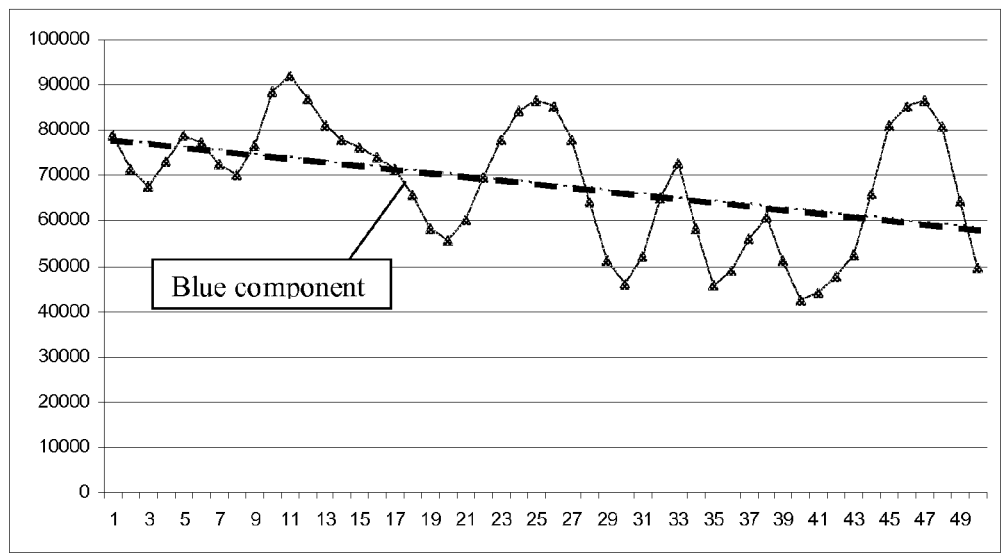
Figure 5:
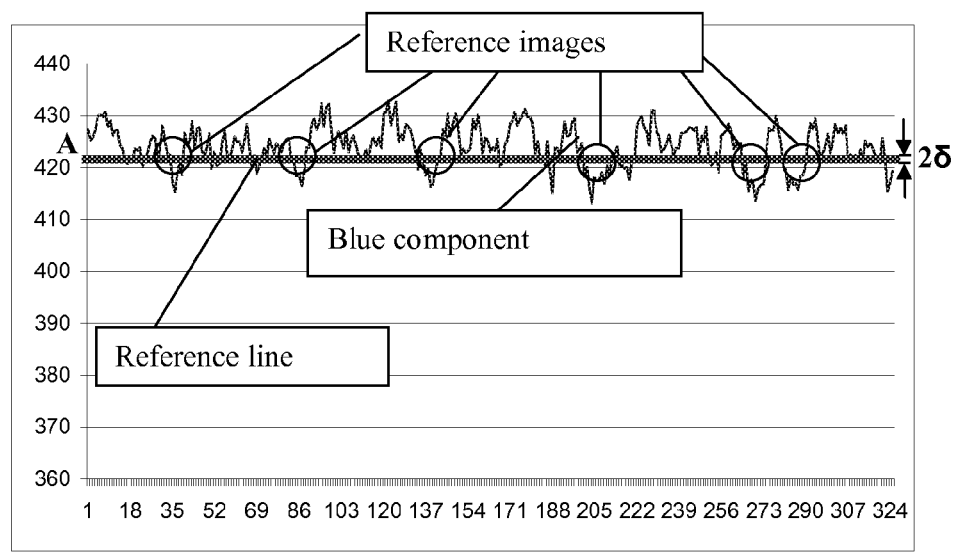
Figure 6:
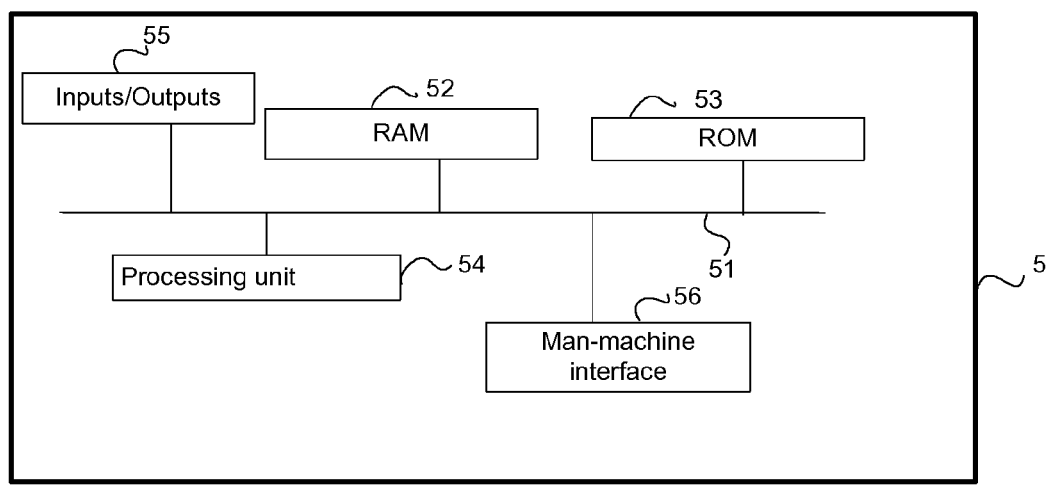

The invention will be better understood and illustrated by means of advantageous embodiments and implementations, by no means limiting, with reference to the figures attached in the appendix, wherein:

FIG. 1 shows an image processing method according to the invention,

FIG. 2 shows, for each colour component, a curve representative of the change in the mean value of the component throughout the sequence of images, FIG. 3 shows, for a colour component, a curve representative of the change in the mean value of the colour component throughout the sequence of images and a reference line in the form of a horizontal line segment representative of the mean value, on the image sequence, of the colour component, FIG. 4 shows, for a colour component, a representative curve of the change in the mean value of the colour component throughout the sequence of images and a reference line in the form of an oblique line segment, FIG. 5 shows, for a colour component, a curve representative of the change in the mean value of the colour component throughout the sequence of images as well as a reference line, and FIG. 6 shows an image processing device according to the invention.

5. DETAILED DESCRIPTION OF THE INVENTION

The invention relates to an image processing method adapted to reduce the flicker effect present in a sequence of images, called source images. At least one colour component is associated with each pixel or image point of a source image. In the case of a black and white image, only one colour component is associated with each pixel, in the case of a colour image, three components are associated with each pixel, e.g. red, green, blue (RGB). A preferred embodiment is illustrated by FIG. 1. On this figure, the represented modules are functional units, which may or may not correspond to physically distinguishable units. For example, these modules or some of them can be grouped together in a single component, or constitute functions of the same software. On the contrary, some modules may be composed of separate physical entities. The method described for a colour component can be generalised in the case of several colour components.

The method comprises a calculation step 10, for at least one part of each source image, of the mean value of the colour component. This mean value is associated with the source image from which it was calculated. Such mean values are shown in FIG. 2 in the form of curves, called mean value curves, drawn in a graph with the source image index on the abscissa and the mean value calculated for at least one part of the source image on the ordinate. According to a first embodiment, this value is calculated for the entire image. According to a variant, this value is calculated on only a part of the previously selected image. The selection of this image part is carried out by a human operator from the observation of the sequence of source images displayed on a screen. More precisely, the operator identifies the image part affected by the flicker effect in the sequence. If this image part is spatially fixed throughout the sequence, the operator selects it on an image displayed on the screen for example by outlining it using an appropriate interface. If this image part is spatially mobile from one image to the other, the operator uses a state of the art tracking method to follow the image part throughout the sequence such as the one described in the document by D. Comaniciu, V. Ramesh and P. Meer entitled "Real-time tracking of non-rigid objects using mean shift" and published in IEEE CVPR 2000.

Step 20 consists in selecting reference images from the mean values calculated in step 10. According to a first embodiment, a first series of reference images is selected during a first selection step 201. For this purpose, the average, called overall average, of the mean values is calculated. An image of the sequence of source images is selected if the mean value that is associated with it lies within a tolerance zone centred on the overall average. According to one variant, a human operator displays on a screen a graph as illustrated in FIG. 2 on which the curve of the mean values is drawn. The abscissa of this graph shows the number of the source images and the ordinate the associated mean value. However, another representation with the number of the images on the ordinate and the associated mean value on the abscissa can also be used. Advantageously, also on this graph is drawn a fixed horizontal line segment of which the ordinate A is equal to the overall average of the curve. Such a line segment is represented by a dotted line in FIG. 3. According to one variant, an inclined line segment representing an approximation of the order of 1 of the curve of mean values is drawn on the graph. Such a line segment is represented by a dotted line in FIG. 4. This variant enables a "normal" variation of the colour that must be maintained to be taken into account. According to a preferred embodiment, the operator chooses the order of approximation of the curves 0 or 1 according to the type of sequence to process. According to another variant, the line segment is mobile between two extreme positions and the operator can move it on the screen. These different variants can be combined. Advantageously, the operator observes a portion of the sequence of source images to identify the images or image parts free from the flicker effect. He positions the mobile line segment (fixed or inclined according to his choice) in such a manner that the mean values calculated in step 10 for the source images free from the flicker effect are on the line segment or in its close neighbouring area. This embodiment is advantageously used when the flicker effect corresponds to the regular appearance of a fault that does not have a null mean. A line segment such as described above, whether fixed or mobile, whether horizontal or inclined is called a reference line. Such a line is represented by a solid line in FIG. 5.

This line segment is advantageously associated with a tolerance zone of width $2\delta$ that is predetermined or set by the operator. Once the reference line is positioned by the operator, a first series of reference images is then automatically selected from the source images. More particularly, a source image of index i is selected as reference image during a first selection step 201 if the mean value, noted MV, calculated in the step 10 for the image or for a part of this image lies within a tolerance zone, i.e. if $MV \in [A-\delta; A+\delta]$ where A is the ordinate of the point of the abscissa reference line i. The value A is called reference value. When several colour components are taken into account simultaneously in the selection of the reference images, the MV values of the corresponding curves must simultaneously verify this constraint with respect to their respective reference lines.

According to a particular embodiment, a subset of the first series of reference images is determined during a second selection step 202. This subset is called second series of reference images. The reference images of the second series are determined in such a manner that the temporal distance in the sequence of source images between two successive images of the second series lies within a time interval [D−ϵ, D+ϵ], where D and ϵ are two parameters set by the operator that can be changed during the method. More precisely, the first image of the first series is selected as first image of the second series. Then the first series is run through to select the other images of the second series in the following manner: the first image of the first series whose temporal distance from the last image selected lies within the interval [D−ϵ,D+ϵ] is selected in turn, and so on until the end of the first series is reached. To ensure that an image to process is always at a reasonable temporal distance from a reference image (i.e. less than (D+ϵ)/2), the first image and the last image of the second series must be distant by a temporal distance less than (D+ϵ)/2 respectively from the first and the last image of the sequence of source images. Moreover, it is advantageous to display in symbolic manner on the screen on which the operator views the curve of mean values a correlation value calculated between 2 successive selected reference images, a correlation value between the first source image and the first reference image, and a correlation value between the last source image and the last reference image. This correlation value is for example calculated from the absolute value of the inter-image difference filtered spatially to obtain a unique correlation value for the two images. The more the images are correlated, the higher is the correlation value. The symbolic representation can for example be a coloured icon positioned on the graph of the mean value curves between each pair of reference images considered above. The icon is green when the correlation value is greater than a threshold and red when it is less than this threshold. The operator can thus observe the pairs of reference images whose correlation button is red, i.e. that are not sufficiently correlated, and possibly intervene by changing the parameters (e.g. D, ϵ, δ) of the method, in order to modify the selection of the reference images of the second series. According to one variant, the icon has more than two different colours, each colour being associated with a correlation level.

According to another embodiment, the reference images of the second series are determined in such a manner that two successive images of the second series are sufficiently correlated, i.e. that a correlation value calculated between these two images is greater than a predetermined threshold. This correlation value is for example equal to the linear correlation coefficient between the two images or is calculated from the absolute value of the inter-image difference filtered spatially to obtain a unique correlation value. More precisely, the first image of the first series is selected as first image of the second series. Then the first series is run through to select the other images of the second series in the following manner: the image of the first series that precedes the first image of this first series whose correlation coefficient calculated in relation to the last image selected is less than a threshold S predetermined or set by the operator is selected in turn, and so on until the end of the first series is reached.

In the two variants previously described for the second selection step 202, it is sometimes preferable to select as first images of the second series not the first image of the first series but another image of the first series. For this purpose, according to a particular embodiment, one of the two variants is applied several times with, each time as first image of the second series one, of the N first images of the first series. Finally, the selection retained is one of those that verifies all the constraints imposed.

The advantage of the two variants described above for the second selection step 202 is to select reference images in such a manner that an image to process is sufficiently correlated with at least one of the two reference images temporally surrounding it, or with the closest reference image if the image to process is located before the first reference image or if it is located after the last reference image. This selection of reference images can ensure a correct subsequent processing.

The operator views the result of the selection of the reference images of the second series on his screen. He can act on the parameters (i.e. D, ϵ, δ and S) and thus modify the selection of the reference images. If, while observing the result of the selection of the reference images, he perceives that this selection is not satisfactory, for example because they are not sufficiently correlated, he can manually add reference images or on the contrary delete them by clicking on the curves shown in FIGS. 3 to 5.

According to another variant, the selection of the reference images of the second series is performed only manually by an operator who selects the images by clicking on the curves shown in FIGS. 3 to 5.

At step 30, the sequence of images is processed to reduce the flicker effect according to a method known by a person skilled in the art. Such a method is described in the document by P. Schallauer, A. Pinz, W. Haas entitled "*Automatic restoration algorithms for* 35 *mm film*", and published in Videre— Journal of Computer Vision Research, Vol. 1, no. 3, 1999 and uses the reference images selected during steps 10 and 20. For each source image surrounded by 2 reference images, a correction function is calculated with respect to each image, then a unique function is deduced from these 2 functions through linear combination weighted by the distances of the image to process from the reference images.

According to an advantageous mode of the invention, the operator uses the curves shown in FIG. 2 to assess the quality of the image processing method ex post facto. For this purpose, the step 10 of the method is applied to the sequence of processed images. It is also advantageous to view on the screen the sequence of images generated by calculating for each pixel the difference between the value of the colour associated with the pixel in the source image and the value of the colour associated with the pixel in the processed image. This sequence allows any error resulting from the processing method to be displayed. Indeed, the processing process is generally not free from faults, and some component values can be modified incorrectly. The viewing of the differences highlights these possible faults and allows the operator to correct them by acting on the parameter of the processing process. Having identified the zones where the processing is defective, the operator can also isolate the regions on screen by means of a manual segmentation tool and modify the processing parameters for this zone only.

The invention also relates to a processing device implementing the process previously described. An example of the architecture of such a processing device 5 is shown in FIG. 6. Only the parts essential to the processing device 5 are shown in this figure. The device 5 notably comprises: a random access memory 52 (RAM or similar component), a read-only memory 53 (hard disk or similar component), a processing unit 54 such as a microprocessor or a similar component, an input/output interface 55 and a man-machine interface 56. These elements are connected to each other by an address and data bus 51. The read-only memory 53 contains the algorithms implementing the steps 10 to 30 of the method according to the invention. Upon powering up, the processing unit 54 loads the instructions of these algorithms into the random access memory 52 and executes them. The random access memory 52 notably comprises the operating algorithms of the processing unit 54 that are loaded when the device is switched on, the source images to process and the different parameters of the process, e.g. D, ϵ, S and δ. The function of the input/ output interface 55 is to receive the input signal (i.e. the sequence of source images) and output the result of the processing according to the steps 10 to 30 of the method, i.e. the processed sequence. The man-machine interface 56 of the device allows the operator to interrupt the processing and manually adjust the parameters (e.g. the position of the reference line, the values D, ϵ, S and δ) used during the selection of the reference images. This adjustment can take place at each step of the method and advantageously as soon as a selection error arises. The results of the processing are stored in random access memory then possibly transferred to the read-only memory to be archived with a view to subsequent processing operations. The man-machine interface 56 notably comprises a control panel and a display screen means. Advantageously, the display screen is adapted to display a graph on which the mean value curve or curves or the corresponding reference lines are drawn. It is also adapted to display the source images of the sequence. The operator sends a command via the man-machine interface 56 to the processing unit 54 to calculate the mean values of each image in accordance with step 10 of the method, to display on the screen, once the necessary calculations are performed, the mean value curve or curves and the reference line or lines. He can repeat this calculation several times on different zones selected from the source images. Each time, the reference images are automatically calculated from the curves and the predetermined parameters. Advantageously, the reference images selected are identified on the screen using circles surrounding the mean value associated with the images as shown in FIG. 5. They can also be identified using a highlighted point to make the information readable without, however, overloading the curves. The operator can also restart the selection of the reference images without restarting the calculation of the mean value curves. He can select the mean value curve or curves to use for the selection of the reference images. He can modify the calculation parameters (e.g. the position of the reference line, the values D, ϵ, S and δ) using the man-machine interface 56. Advantageously, when he modifies these parameters, for example using cursors, the new reference images are almost instantly displayed on the screen, which gives a real understanding of the effects of these parameters on the selection and prevents a long process of trial and error. The operator can also select the reference images manually on the curves by clicking on the values of the curve corresponding to the images of the sequence that he wants to select as reference images, e.g. the images whose mean value is close to the associated reference line. The operator can also add or remove the reference images by clicking on the curves drawn on the graph displayed on the screen. More precisely the operator clicks on the point of the curve of mean values corresponding to the images that he wants to select a reference image or on the contrary that he wants to remove from the set of reference images.

The invention claimed is:

1. Method of processing a sequence of images comprising image points each of which is associated with at least one colour component, said method comprising the following steps:
    selecting reference images in said sequence;
    processing at least one image of said sequence on the basis of said selected reference images, said step being adapted to reduce flicker effects;
    wherein the step of selecting reference images comprises the following steps:
    calculating, for at least one image part of each image of said sequence, the mean value of said at least one colour component;
    displaying a curve, called curve of mean values, on a two dimensional graph, said curve associating each frame with the corresponding mean value;
    positioning on said graph a predefined reference curve; and
    selecting, as a first series of reference images, the images of said sequence whose associated mean value lies in a predefined spatial neighborhood of said reference curve.

2. Method according to claim 1, wherein said predefined reference curve is a horizontal line segment.

3. Method according to claim 2, wherein said horizontal line segment is positioned on the average of said mean values associated with all the images of said sequence.

4. Method according to claim 1, wherein said predefined reference curve is an oblique line segment.

5. Method according to claim 1, wherein the step for selecting the first series of reference images is followed by a step for selecting a second series of reference images forming a subset of said first series of reference images such that two successive images of said second series are spaced at a temporal distance contained within a predetermined time interval.

6. Method according to claim 1, wherein the step for selecting the first series of reference images is followed by a step for selecting a second series of reference images forming a subset of said first series of reference images such that a correlation value calculated between two successive images of said second series is greater than a predetermined threshold.

7. Device for processing a sequence of images comprising image points each of which is associated with at least one colour component, said device comprising:
    selection means for selecting reference images in said sequence;
    processing means adapted to reduce the flicker effects in said sequence from reference images,
    calculation means for calculating, for at least one image part of each image of said sequence, the mean value of said at least one colour component;
    means for displaying a curve, called curve of mean values, on a two dimensional graph, said curve associating each frame with the corresponding mean value;
    means for positioning on said graph a predefined reference curve; and
    selection means for selecting the images of said sequence whose associated mean value lies in a predefined spatial neighborhood of said reference curve.

8. Device according to claim 7, wherein said predefined reference curve is a horizontal line segment.

9. Device according to claim 8, wherein said horizontal line segment is positioned on the average value of said mean values associated with all the images of said sequence.

10. Device according to claim 7, wherein said predefined reference curve is an oblique line segment.

11. Device according to claim 7, wherein each of said reference images selected by said selection means is identified on the graph using a circle surrounding, on the mean values curve, the point whose ordinate is equal to the mean value associated with the reference image.

12. Device according to claim 7, wherein each of said reference images selected by said selection means is identified on the graph using a highlighted point, on the mean values curve, whose ordinate is equal to the mean value associated with the reference image.

13. Device according to claim 7, wherein a coloured icon is displayed on the graph to indicate a level of correlation between two successive reference images selected by said selection means, the colour of said icon being representative of said level of correlation.

* * * * *